United States Patent
Mukhopadhyay et al.

(10) Patent No.: US 11,568,081 B2
(45) Date of Patent: Jan. 31, 2023

(54) SECURE AND PRIVATE HYPER-PERSONALIZATION SYSTEM AND METHOD

(71) Applicant: Microsoft Technology Licensing, LLC, Redmond, WA (US)

(72) Inventors: Debasish Mukhopadhyay, Sammamish, WA (US); Bryston Nitta, Redmond, WA (US); Chen Liang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 577 days.

(21) Appl. No.: 16/550,084

(22) Filed: Aug. 23, 2019

(65) Prior Publication Data
US 2021/0056226 A1    Feb. 25, 2021

(51) Int. Cl.
| | |
|---|---|
| G06F 21/00 | (2013.01) |
| G06F 21/62 | (2013.01) |
| G06N 20/00 | (2019.01) |
| G06F 9/455 | (2018.01) |
| G06N 5/04 | (2006.01) |

(52) U.S. Cl.
CPC ...... *G06F 21/6245* (2013.01); *G06F 9/45558* (2013.01); *G06N 5/04* (2013.01); *G06N 20/00* (2019.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 10,673,702 | B2* | 6/2020 | Harneja | H04L 41/12 |
| 10,922,367 | B2* | 2/2021 | Podgorny | G06N 20/00 |
| 10,990,850 | B1* | 4/2021 | Chen | G06K 9/6262 |
| 11,269,665 | B1* | 3/2022 | Podgorny | G06N 20/00 |

(Continued)

OTHER PUBLICATIONS

Elsherif, Ahmed R. et al. Inference-driven dynamic access scheme for interference management in heterogeneous networks. 8th International Conference on Cognitive Radio Oriented Wireless Networks. https://ieeexplore.ieee.org/stamp/stamp.jsp?tp=&arnumber=6636814 (Year: 2013).*

(Continued)

*Primary Examiner* — Jeremiah L Avery

(57) ABSTRACT

A secured virtual container is enabled to securely store personal data corresponding to a user, where such data is inaccessible to processes running outside the secured virtual container. The secured virtual container may also include an execution environment for a machine learning model where the model is securely stored and inaccessible. Personal data may be feature engineered and provided to the machine learning model for training purposes and/or to generate inference values corresponding to the user data. Inference values may thereafter be relayed by a broker application from the secured virtual container to applications external to the container. Applications may perform hyper-personalization operations based at least in part on received inference values. The broker application may enable external applications to subscribe to notifications regarding availability of inference values. The broker may also provide inference values in response to a query.

20 Claims, 9 Drawing Sheets

(56) References Cited

U.S. PATENT DOCUMENTS

| | | | | |
|---|---|---|---|---|
| 11,283,680 | B2* | 3/2022 | Kompella | H04L 41/0893 |
| 11,429,893 | B1* | 8/2022 | Tong | G06N 5/04 |
| 2015/0365351 | A1* | 12/2015 | Suit | G06F 8/60 |
| | | | | 709/226 |
| 2017/0180363 | A1* | 6/2017 | Smith | H04L 67/306 |
| 2017/0372226 | A1 | 12/2017 | Costa et al. | |
| 2019/0156247 | A1* | 5/2019 | Faulhaber, Jr. | G06N 3/08 |
| 2019/0236485 | A1* | 8/2019 | Stanley, III | H04L 67/303 |
| 2019/0327259 | A1* | 10/2019 | DeFelice | H04L 63/1408 |
| 2020/0104750 | A1* | 4/2020 | Kandoi | G06F 9/505 |

OTHER PUBLICATIONS

Swami, Kapilesh S.; Sawant, A. A. Securing Database by Using Collaborative Inference Detection. 2010 Second International Conference on Computer Research and Development. https://ieeexplore.ieee.org/stamp/stamp.jsp?tp=&arnumber=5489533 (Year: 2010).*

Meurisch, et al., "AssistantGraph: An Approach for Reusable and Composable Data-driven Assistant Components", In Proceedings of the IEEE 43rd Annual Computer Software and Applications Conference, Jul. 15, 2019, pp. 513-522.

"International Search Report and Written Opinion Issued in PCT Application No. PCT/US20/037337", dated Sep. 23, 2020, 12 Pages.

Pillai, Priyanka, "Windows 10 Device Guard and Credential Guard Demystified—Microsoft Tech Community—376419", Retrieved From: https://techcommunity.microsoft.com/t5/iis-support-blog/windows-10-device-guard-and-credential-guard-demystified/ba-p/376419, Mar. 18, 2019, 9 Pages.

* cited by examiner

SECURE AND PRIVATE
HYPER-PERSONALIZATION SYSTEM AND
METHOD

BACKGROUND

Products and services are increasingly being marketed and sold in various ways that are facilitated by computing devices. For example, businesses today often operate through e-commerce platforms that consumers access with a browser or other application from a personal computer, smart phone, tablet or the like. Business analytics have revealed that a personalized e-commerce experience can drive sales and also generate brand loyalty. Historically, such personalized experiences were driven by aggregating customer data (age, location, purchase histories, and the like) to identify similar groups of people, and thereafter treating each member of a given group as having the persona of that group. Decisions about how to personalize the e-commerce experience and/or market to a particular person were thereafter dictated by the persona assigned to that person, and thus the experience is at least somewhat personalized to that person.

Hyper-personalization attempts to achieve the same goals as the personalization experience described above, but in a manner that is specifically tailored to a person based on that person's customer data. Delivering a hyper-personalized experience for a customer typically involves the application of a user's private data (e.g., buying history, usage information, financial information, demographics, biometrics, relationships/social connections) to sophisticated machine learning algorithms.

E-commerce vendors and other service providers typically invest a lot of money in creating and training machine learning models, and such models may thereafter embody a great deal of proprietary business intelligence. For this reason, such models are closely held secrets. That is, vendors simply cannot trust that their models will not be misused, and therefore choose not to distribute such models.

Accordingly, to receive a hyper-personalized experience based on the output of such a machine learning model, a user typically must be willing to provide all their private data to a vendor/service provider for them to apply the data to their model. Unfortunately, this means that the user simply must trust that the service provider will not mis-use the personal data (e.g., by selling access to the data to third-parties), and that the service provider is willing and able to safeguard the data (i.e., prevent hackers from stealing the data).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described herein that enable users to receive hyper-personalized experiences while retaining possession and control over all of their private data. Furthermore, service providers are enabled to deliver hyper-personalized experiences while maintaining the secrecy of proprietary machine learning models. Further embodiments may advantageously permit detection of abnormal user behaviors (e.g., by online service providers) and abnormal machine behavior (i.e., detection of malware, viruses, worms, root kits, and the like), and provide for the prediction of device failures and providing of automatic remediation measures to address same.

In an example aspect, a secured virtual container is maintained on a computing device, where the secured virtual container is isolated from an operating system executing on the computing device. The secured virtual container and operating system may each run in parallel through a shared hypervisor, with virtualization features of the hypervisor and underlying hardware enforcing the isolation of each. In alternative embodiments, the secured container may be implemented in a hardware container (i.e., not virtualized on the computing device) wholly separate from the computing device.

In further aspects, the secured virtual container is enabled to securely store personal data corresponding to a user, where such data is inaccessible to processes running outside the secured virtual container. Such data may partially or wholly comprise features and/or feature vectors suitable for use with a machine learning model. A set of features corresponding to an inference category may be selected from the data, and an inference value for the category may be generated. Such generation may be accomplished in various ways such as by a suitably trained machine learning model. Thereafter, information regarding the availability of one or more inference values for various inference categories may be published to a broker external to the secured virtual container. The broker, for instance, may comprise an application running in an operating system separate and isolated from the secured virtual container. Applications may thereafter query the broker for the availability of one or more inference values corresponding to particular inference categories, and upon receiving such inference values, perform hyper-personalized operations based at least in part thereon.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
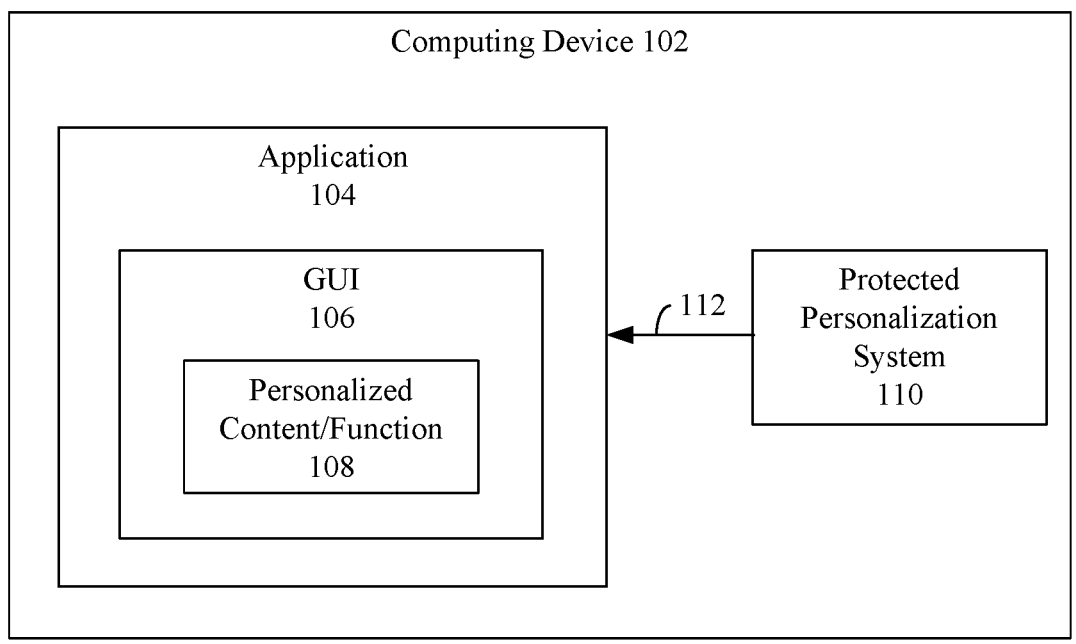
FIG. 1 depicts an example computing device including a protected personalization system, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In embodiments, secure and private hyper-personalization is enabled by applying an obfuscation process to data specific to a particular user, whereby the user's data is, for example, hashed, normalized, and/or feature engineered, and thereafter provided in digest form to applications and/or operating system services. In embodiments, the obfuscation process may comprise applying user data to a machine learning model. User data is accordingly input to the system for hyper-personalization.

Such user data may, for example, by stored in a protected data store that is not directly accessible to a computing device's operating system or applications. Likewise, the obfuscation process may run within a protected personalization container that includes the protected data store. For example, a machine learning model may be securely transferred to the protected personalization container and made operable to perform operations on the use data stored within the protected data store (with due care being taken that such operations do not leak the user data outside the container). The output of the machine learning model may comprise the above mentioned hashed/normalized/feature engineered digest form of the user data that may be provided to the operating system and/or applications. Using a protected personalization container in this manner safeguards both user data, and the machine learning models that operate on the data. The various types of user data usable by embodiments will now be described.

User data may be collected in various ways, such as with the help of multiple direct or indirect sensors, and may be subsequently processed and/or stored in various ways, such as the form of a graph (e.g., using a graph database system). Such a graph may be constructed in a logically layered manner. For example, the first layer may consist of a policy layer that embodies policies, rules, values, and/or other foundational operating principles of the system that rarely change. For example, hyper-personalized work environment may operate based in part on security rules set by the company. Such rules may be based on a user's preference, risk profile, social profile and the like. Corporate machines that implement embodiments of a protected personalization system as described herein may be configured to have certain corporate rules and exclusion principles related to usage of the machine. Such rules may be a very granular and targeted interpretation of corporate policy that system configuration ("SCCM") or mobile device management ("MDM") tools enforce. For example, SCCM/MDM rules may disable USB ports on a device, prevent sending emails with any attachments and/or prevent or limit the taking of screenshots.

A second graph layer may include a knowledge graph, in an embodiment. A knowledge graph contains slowly changing knowledge about a user. The knowledge graph layer may be regarded as a 'warm' data layer inasmuch as such data changes slowly over time (e.g., time scales greater than a day). For example, the knowledge graph may reflect the user's risk profile, financial profile, application usage profile(s) and/or personalization data (e.g., preferences), habits, relationships, demographics, psychographic information, health, education, hobbies, commitments, basic social and/or professional network. Demography information may include, for example, recent face image, skin color, hair color, eye color, name, age, income, profession, home location, office location, resume information, music taste, Wi-Fi names, passwords, family members details, and the like. A knowledge graph may also include information about the computing device in use such as, make and model of the computer or mobile device, machine/device health status, as well as identification of available sensors. As mentioned above, the information in the knowledge layer changes relatively infrequently and embodiments may update such information using batch algorithms during night/free times.

Embodiments may also implement a third graph layer described herein as the transient layer. A transient layer typically includes data created and/or updated during a recent pre-determined time interval (e.g., time scales less than a day). For example, embodiments may create the transient layer by processing a rolling 20-minute window of signals captured by the sensors and running basic processing to get a basic view of the state of use of the personal computer. For example, use states, presence, flow of users, dwell, interaction, engagement, atmosphere and system states. Transient layer information may also include the lock state of a computing device, the identity of the at least one user of the computing device, the location of the computing device, policy violations on the computing device, the identity of persons physically present with the at least one user of the computing device, the task being performed on the computing device, reminders, SMS (short message service) or MMS (multimedia messaging service) messages, emails, memory and/or file access signals, application states and application specific data.

Data in a transient layer may also include data corresponding to some predetermined period of time into the future. For example, the transient layer could include a trailing 20 minutes of sensor and other data, as well as data regarding events that will happen, for example, in the near future. In embodiments, such future focused transient layer data may be at least partially gleaned from calendar and/or free/busy data of the user, and thus reflect near future time commitments or other promises made via email, social networks, and the like. Alternatively, embodiments may learn user habits over time and predict likely near future actions of the user, and include such in the transient layer.

Transient layer data may include temporary/ephemeral data because certain types of data are not useful beyond a certain limited timeframe. For example, many useful types of data are only of interest in real time (e.g., temperature or location). Transient layer data need not, however, be completely temporary. Some transient layer data may be persisted in, for example, the second layer described above. For example, activity and/or usage data related to the user may not only be of interest in the present moment (as reflected by the transient layer), but also may be of interest over a longer time frame for determining general usage patterns over time. In addition to these data layers, a graph may include a service/management layer that includes functions for managing, updating and querying the data layers as will discussed in more detail below.

Thus, in embodiments, the transient layer will have a constantly changing graph of data with who the user is, who else may be present with them, where the user is, whether that is a public location (i.e., a protected location or not), whether the user is in motion or at rest, how fast the user may be traveling. Accordingly, the transient layer may be regarded as 'hot' data that rapidly changes with the user states.

Each of the abovementioned layers may correspond to one or more processing layers, in embodiments. For example, "hot path" processing of transient layer data gathered from sensors may be cached, and such data quarriable via API (application programming interface) calls. Similarly, information in the knowledge graph layer may be handled via a batch processing layer that may create analytical outputs, in form or forecast, classifications, and generative data about the user and environment of the types discussed in detail above.

Hyper-personalization services are described as follows in the context of a specific example. In particular, consider a computer operating system configured to provide hyper-personalization of the user interface, as well as provide hyper-personalization services to applications running on the operating system. It should be understood, however, that the described computer and operating system are merely exemplary, and embodiments may readily be implemented on other types of computing devices such as mobile devices/smart phones, and as discussed further herein below.

In embodiments, and as discussed above, enabling hyper-personalization requires that a user agree to the collection and use of information regarding the user. When a user agrees to enable hyper-personalization, they agree that the system may gather and process information only for internal device level consumption, and not for sharing to third parties. Granting such permission allows, for example, a laptop or desktop running in hyper-personalization mode to connect to any of a variety of data gathering devices such as: cameras, microphones, gaming consoles (e.g., Microsoft Xbox), mobile phones, TVs, monitors, printers, Bluetooth peripherals and any other devices that the operating system may access. Various types of data may be collected such as, for example, audio, video, radio signals, images, ambient light readings, motion, location, vibrations, velocity, acceleration, inertial sensor readings, magnetism, pressure, temperature, voltage, current, moisture and/or any other sensor information that the computer may access/receive.

When a user attaches a peripheral to the computer, users typically expect a nearly "Plug and Play" experience. That is, the computer will have necessary access to the devices to connect and activate them using driver software. Similarly, a protected personalization system executing on the personal computer may act as the user agent, activate needed peripherals and/or sensors at different time intervals, and collect information about the user state and local environment. Embodiments of a protected personalization system may have strict user awareness through, for example, conventional identification and authentication mechanisms (i.e., the system customizes operation based on who is logged into the machine). Other embodiments of a protected personalization system may be configured to automatically identify the user through sensors.

Whether embodiments function through login dialogs, or through automatic sensor-based identification, it should be understood that the hyper-personalization experience may vary for the same user. That is, embodiments may track multiple personas for each person, wherein a persona corresponds to a particular usage context. For example, a user may use their office computer at home as well as in the office. In the "Office" persona of the user, the user mostly sits at a desk and a camera can pick up the background and items around users to detect the location (other means of detecting location are possible in embodiments, such as global positing system (GPS), etc.). Moreover, people often wear certain types of clothes when in an "office" or "workplace" persona. For example, they may where hats and shirts with company logos, scrubs, where a certain hair style, use different glasses, wear more or less make-up, and the like. Workplaces typically will also have relatively unique visual and audio characteristics (at least as compared to a home environment). For example, workplace infrastructure/furniture such as cubicles, desks, counters, chairs and the like generally are different from home infrastructure/furniture.

In addition to visual cues, audio at every location is different, and signatures may be identifiable in each. For example, workplace locations will have the hissing of the computers and fans, low frequency voice transmission through the walls, ringing phones, elevator noise, printers, drawers, coffee machine, industrial refrigerators, air conditioners and the like which all emit different sounds than may typically be present in a home environment. Besides audio and visual clues, there are other signals such as use of docking station, Wi-Fi, keyboard and mouse, printer connections etc. that may also tell us about the location of the user and what persona he or she will likely to have at any point. All the above described differences may be detected and stored (typically in the transient layer) and dictate which persona of the user should govern the hyper-personalization experience.

Enabling a secure personalization system to gather and store the above described user information, and to obfuscate such information in a secure modeling environment may be accomplished in numerous ways. For example, FIG. 1 depicts an example computing device 102 including a protected personalization system 110, according to an embodiment. As shown in FIG. 1, computing device 102 includes an application 104 and protected personalization system 110. Application 104 includes a GUI 106 that includes personalized content/function 108. Other structural and operational embodiments will be apparent to persons skilled in the relevant art(s) based on the following discussion regarding computing device 102 as depicted in FIG. 1.

Embodiments of computing device 102 may include any type of mobile computer or computing device such as a handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), a wearable device (e.g., virtual reality glasses, helmets, and visors, a wristwatch (e.g., an Apple Watch®)), and other types of mobile devices. In further embodiments, computing device 102 may be stationary computer or computing device, such as a desktop computer.

In embodiments, protected personalization system 110 is configured to securely store user information of the types described herein, and to securely process such information to produce digest forms of the user information. For example, protected personalization system 110 may be configured to accept a suitably trained machine learning model capable of accepting user information (whether in raw form or pre-processed into suitable features) and producing inferences 112 therefrom. Inferences 112 may comprise, for example, a score representing the probability that a given proposition about the user is true based upon the user information securely provided to the model. For example, inferences 112 may include the probability that the user is in the office, the probability that the user likes particular shows or genres of shows, the probability that the user has bought particular types of products in the last 6 months, or the probability that the user belongs to a particular demographic group. Note, the above described example inferences 112 are merely exemplary, and inferences 112 may include virtually any type of inference capable of being modeled based on the available user information.

Figure 2:
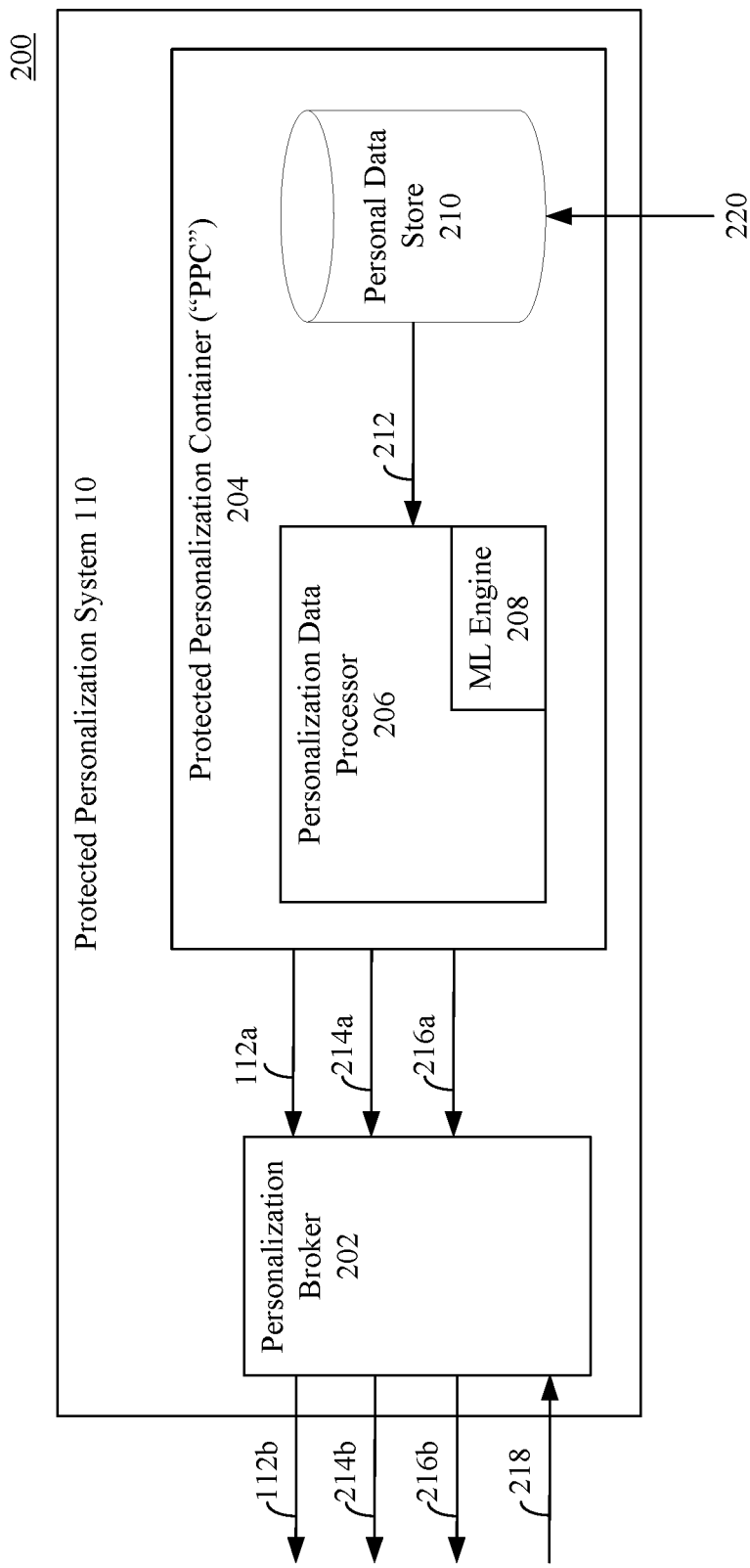
FIG. 2 depicts an example protected personalization system, according to an embodiment.

Numerous ways exist of implementing protected personalization system 110 and interfacing protected personalization system 110 with an operating system and/or application. For example, FIG. 2 depicts an example protected personalization system 110, according to an embodiment. Protected personalization system 110 includes a personalization broker 202 and a protected personalization container 204. The PPC 204 includes a personalization data processor 206 and a personal data store 210. The personalization data processor 206 includes a Machine Learning ("ML") Engine 208. Other structural and operational embodiments will be apparent to persons skilled in the relevant art(s) based on the following discussion regarding protected personalization system 110 as depicted in FIG. 2.

At a high level, embodiments of protected personalization system 110 may be configured to receive and store user data 220 (i.e., all the above described types user data) in policy, knowledge graph and transient data layers within personal data store 210 of protected personalization container 204. Protected personalization container 204 prevents compromised applications or operating system components from directly accessing user data 220 as stored in personal data store 210, and instead requires all access to go through personalization broker 202. Personalization broker 202 is configured to securely interface with personalization data processor 206 to perform such indirect access to user data 220.

Personalization data processor 206 may be configured to select features and/or labels from user data 220 as stored in personal data store 210 to train machine learning modules residing in ML engine 208. Alternatively, pre-trained ML models may be received and stored by personalization data processor 206 for subsequent processing of features selected from or generated by personalization data processor 206 and/or personal data store 210 based upon user data 220 stored in personal data store 210. Features to be selected may be determined based at least in part on which model or models is/are present in ML engine 208 inasmuch as different models generally generate different inferences, and depend on different types of underlying user data 220. These general operations, among others, of protected personalization system 110 and components contained therein are now described in further detail.

In embodiments, ML engine 208 may interoperate with or employ various machine learning frameworks, converters, runtimes, compilers and visualizers as known to persons skilled in the relevant art(s). For example, ML engine 208 may be configured to include and/or operate models in the Open Neural Network Exchange ("ONNX") format. ONNX is an open format for machine learning models that allows models to be shared and adapted for use with various ML frameworks and tools. For example, Microsoft Windows® ML allows for rapid integration of pre-trained machine learning models into various applications, and embodiments may adapt Windows® ML for use inside the above described secure container. Alternative embodiments may, instead of or in addition to adapting a ML framework such as Microsoft Windows® ML, instantiate a short-lived data pack and access protocol enabling usage of ONNX models on short-lived data of user data 220. Example machine learning models will be discussed in further detail herein below in conjunction with FIGS. 6 and 7.

In embodiments, protected personalization container 204 comprises a virtual container that is isolated from an operating system running the user system and applications. Such isolation prevents even the operating system from accessing user data 220, which thereby prevents any malicious programs running therein from accessing such data. In embodiments, protected personalization container 204 may comprise a container such as a virtual sandbox that operates within the context of the operating system, but is sufficiently hardened to prevent direct operating system access to the user data 220 as stored in personal data store 210.

Alternatively, and as described in more detail below, protected personalization container 204 may comprise a virtualized container that runs in parallel with and fully isolated from the operating system. Examples of such containers may include virtual secure mode ("VSM") containers in Windows 10 Enterprise, Intel Clear Containers, Kata containers and/or Google gVisor containers. Embodiments of protected personalization container 204 may be configured to incorporate personal data store 210 and personalization data processor 206 within the confines of the container thereby securely separating processes running in personalization data processor 206, and user data 220 stored in personal data store 210, from the operating system.

Embodiments of personalization data processor 206 are configured to act as the interface between user data 220 stored in personal data store 210, and systems and processes that exist outside of protected personalization container 204. Personalization data processor 206 is configured to support data obfuscation operations through ML engine 208. In particular, ML engine 208 is configured to include, or to receive and incorporate, machine learning models that digest user data 220 retrieved from personal data store 210 to produce the above described inference values 112, and provide such inference values 112a to personalization broker 202 for relaying as inference values 112b to external consumers.

Personalization data processor 206 may also be configured to keep track of the various types or categories of inferences that may be accessed through personalization broker 202, and to provide inference categories 214 to personalization broker 202. Personalization broker 202 is in turn configured to publish inference categories 214 to entities outside of protected personalization system 110 that may wish to retrieve such inferences to construct a hyper-personalization experience for the user. Personalization broker 202 may be further configured to accept inference queries/subscriptions 218 from outside entities. Inference queries/subscriptions 218 may comprise one or more direct queries to personalization broker 202 for desired inference values and may also comprise one or more subscriptions. In embodiments, inference values may be logically grouped together into topics. A topic may comprise, for example, a category or type of inference value that may be of interest. For example, inference values related to a user's hobbies may be logically grouped into a "hobbies" topic. Interested entities may subscribe to the "hobbies" topic and thereafter be notified of any new or changed inference values that have been tagged with the "hobbies" topic.

As discussed above, user data 220 stored in personal data store 210 is subject to change over time. In the case of transient layer data, such information may be subject to rapid change. Likewise, inferences based on such information must therefore change over time. Inference subscriptions permit outside entities to instruct personalization broker 202 to automatically detect changes to inferences of interest, and to send one or more notifications 216 when updated inference values 112a are available. Alternatively, personalization broker 202 may be configured to operate in a push mode whereby inference values 112b are automatically pushed to subscribers as changes to such inferences are made by personalization data processor 206 either alone or in conjunction with ML engine 208.

Figure 3:
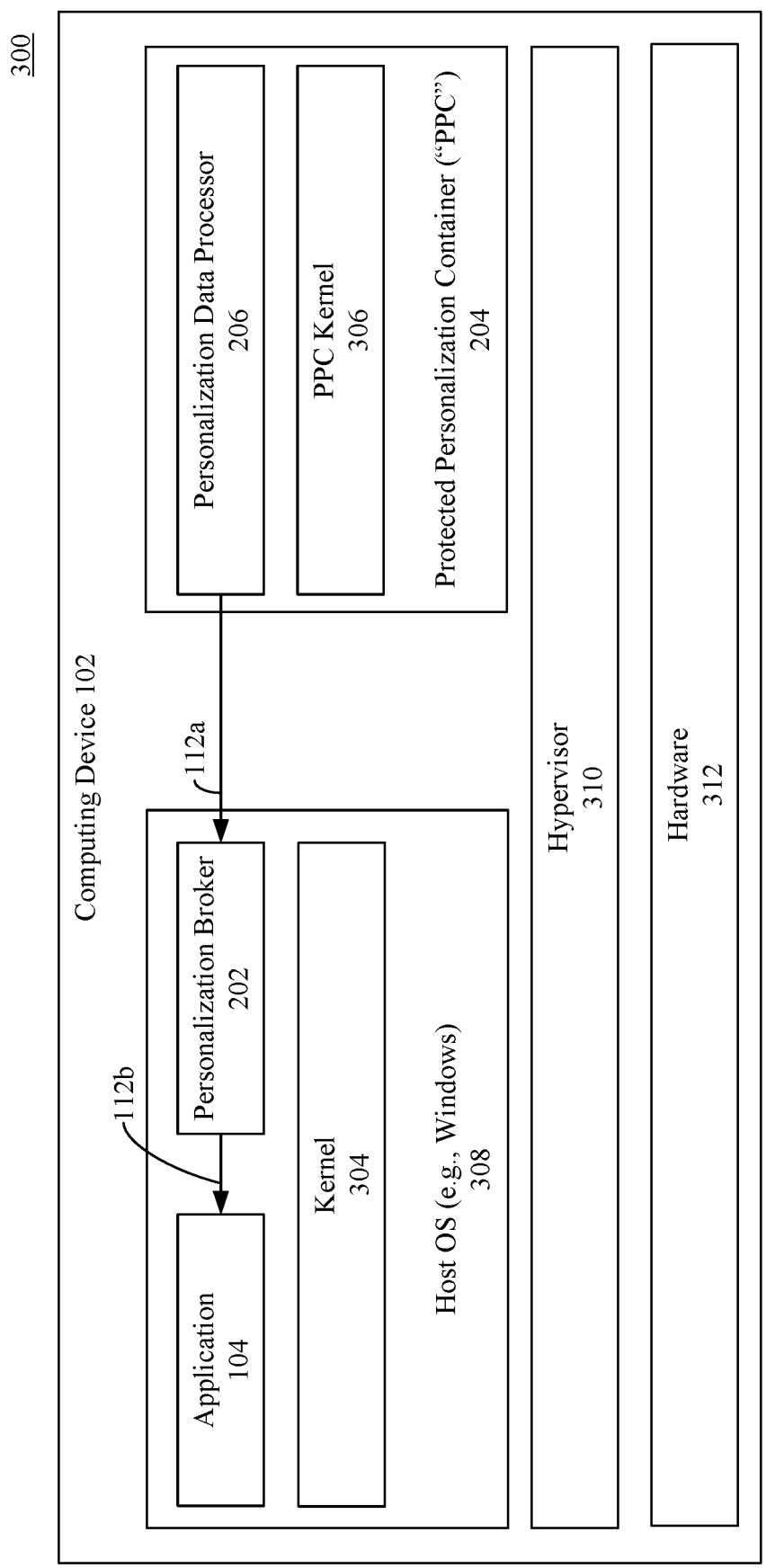
FIG. 3 depicts a stack view of an example computing device including a protected personalization system, according to an embodiment.

As described above, protected personalization system 110 and protected personalization container 204 may be configured in various ways. For example, FIG. 3 depicts a stack view of an example computing device 102 including a protected personalization system, according to an embodiment. Computing device 102 includes a host operating system 308, protected personalization container 204, hypervisor 310 and hardware 312. Other structural and operational embodiments will be apparent to persons skilled in the relevant art(s) based on the following discussion regarding computing device 102 as depicted in FIG. 3.

In embodiments, host OS 308 and protected personalization container 204 are each virtual machines running atop hypervisor 310 which in turn is running on, and abstracts the underlying hardware 312. Host OS 308 includes a kernel 304 for performing operating system functions and providing an application environment wherein application 104 and personalization broker 202 may execute. Protected personalization container 204 likewise includes its own kernel 306 that not only provides protected personalization container 204 specific system functions (e.g., retrieval of data from personal data store 210), but also provides the operating environment wherein personalization data processor 206 may execute. Hypervisor 310 is configured to prevent processes in host OS 308 and protected personalization container 204 from directly accessing the resources of the other. In operation, personalization broker 202 of host OS 308 may be configured to communicate with protected personalization container 204 by, for example, a network connection thereby enabling communication of inference values 112b from protected personalization container 204 to host OS 308. Other techniques of enabling communication between isolated containers may be employed as may become apparent to persons skilled in the relevant art(s) based on the teachings herein.

With continued reference to computing device 102 of FIG. 3, personalization broker 202 running in host OS 308 may be configured to accept inference values 112a and relay same to running applications (e.g., application 104) or operating system components elsewhere in host OS 308, where such applications and/or operating system components may be configured to perform personalization operations based at least in part on inference values 112b. For example, application 104 may be configured to customize a user interface associated with application 104. Such customization may be performed based on, for example, an inference values 112b that indicates a high likelihood that the user is currently located at work, and at a particular location on the work campus (i.e., by displaying notifications of events near the user).

Alternatively, components of host OS 308 may be configured to perform customization operations based on inference values 112b. For example, host OS 308 may be configured to alter display output characteristics to reduce blue light output based on a) the time of day, and b) inference values 112b that indicate a high probability that the user environment currently has reduced ambient lighting, and c) where other inference values 112b indicate a high probability that the user has a configuration preference for, or a habit of setting, a low blue light display setting in low ambient lighting at night. It should be noted that these examples are far from exhaustive, and various inference categories and values are limited only by availability of machine learning model(s) suitably configured to generate a desired inference value, and availability of sufficient user data 220 for use by such model(s).

Further operational aspects of computing device 102 of FIG. 1, and protected personalization system 110 of FIG. 2 will now be discussed in conjunction with FIG. 4 which depicts a flowchart 400 of an example method an example method for providing secure hyper-personalization in a computing device, according to an embodiment. Flowchart 400 is described with continued reference to FIGS. 2 and 3. However, other structural and operational embodiments will be apparent to persons skilled in the relevant art(s) based on the following discussion regarding flowchart 400 of FIG. 4 and protected personalization system 110 of FIG. 2.

Flowchart 400 begins at step 402. At step 402, feature data is stored in a secured virtual container executing on a computing device in parallel with and isolated from an operating system executing on the computing device. For example, and with reference to protected personalization system 110 of FIG. 2, personal data store 210 within protected personalization container 204 (i.e., a "secured virtual container") may be configured to store feature data such as, for example, personal user data 220 of the types described herein above. Also as described above in conjunction with the description of FIGS. 2 and 3, protected personalization container 204 may comprise a virtual container executing on a computing device in parallel with and isolated from an operating system executing on the device. In particular, and with reference to FIG. 3, protected personalization container 204 may be configured to execute atop hypervisor 310, in parallel with host OS 308 and isolated therefrom. Flowchart 400 of FIG. 4 continues at step 404.

In step 404, a first set of features is selected from the stored feature data. For example, and with continued reference to protected personalization system 110 of FIGS. 2 and 3, in the manner described in detail above, in an embodiment. More specifically, normalized or otherwise feature engineered versions of user data 220 may be retrieved from personal data store 210 and subsequently provided to ML engine 208 for processing. Selection of such features depends on the specific data a given model requires for generating a particular inference. Moreover, though a given model may be capable of generating multiple inferences, not all such inferences may be of interest to external consumers at any given moment in time, and consequently, corresponding features need not be selected and retrieved. Flowchart 400 of FIG. 4 continues at step 406.

In step 406, a first inference value for a first inference category is generated in the secured virtual container based at least in part on the first set of features. For example, and with continued reference to protected personalization system 110 of FIGS. 2 and 3, ML engine 208 may be configured to include a suitably trained machine learning model configured to accept feature data (i.e., feature processed user data 220) retrieved from personal data store 210, and to generate one or more inference values in the manner described in detail above, in embodiments. Flowchart 400 continues at step 408.

At step 408, availability of the first inference value corresponding to the first inference category is notified to a broker external to the secured virtual container. For example, and with continued reference to protected personalization system 110 of FIGS. 2 and 3, personalization data processor 206 may be configured to generate notifications 216 in response to the generation of inference values by ML engine 208, and to send same to personalization broker 202 in the general manner described in detail above, in embodiments. In the embodiment illustrated in FIG. 2, personalization data processor 206 (as well as ML Engine 208 which is part of personalization data processor 206) is included in protected personalization container 204, whereas personalization broker 202 is external to the secured virtual container (i.e., protected personalization container 204). Flowchart 400 continues at step 410.

At step 410, the first inference value is received at the broker from the secured virtual container. For example, and with continued reference to protected personalization system 110 of FIGS. 2 and 3, personalization broker 202 is configured to accept inferences 112 relayed from protected personalization container 204 after generation of such inferences by ML engine 208 of personalization data processor 206 in the same general manner as described in detail above, in embodiments. Flowchart 400 concludes at step 412.

At step 412, the first inference value is provided by the broker to at least one running process in the operating system, wherein the at least one running process is configured to perform a personalization operation based at least in part on the first inference value. For example, and with continued reference to protected personalization system 110 of FIGS. 2 and 3, personalization broker 202 inference values 112a as received from personalization data processor 206 of protected personalization container 204 may be provided as inference values 112b to processes outside of protected personalization system 110. For example, personalization data processor 206 within protected personalization container 204 may be configured to communicate inference values 112a from protected personalization container 204 to personalization broker 202 executing in the context of host OS 208, where personalization broker 202 in turn communicates inference values 112b to application 104 (also running on host OS 308). As discussed above, application 104 may be configured to customize the user experience based at least in part on the inference values 112b received from personalization broker 202.

In the foregoing discussion of steps 402-412 of flowchart 400, it should be understood that at times, such steps may be performed in a different order or even contemporaneously with other steps. Other operational embodiments will be apparent to persons skilled in the relevant art(s). Note also that the foregoing general description of the operation of protected personalization system 110 is provided for illustration only, and embodiments of protected personalization system 110 may comprise different hardware and/or software, and may operate in manners different than described above. Indeed, steps of flowchart 400 may be performed in various ways.

Figure 4:
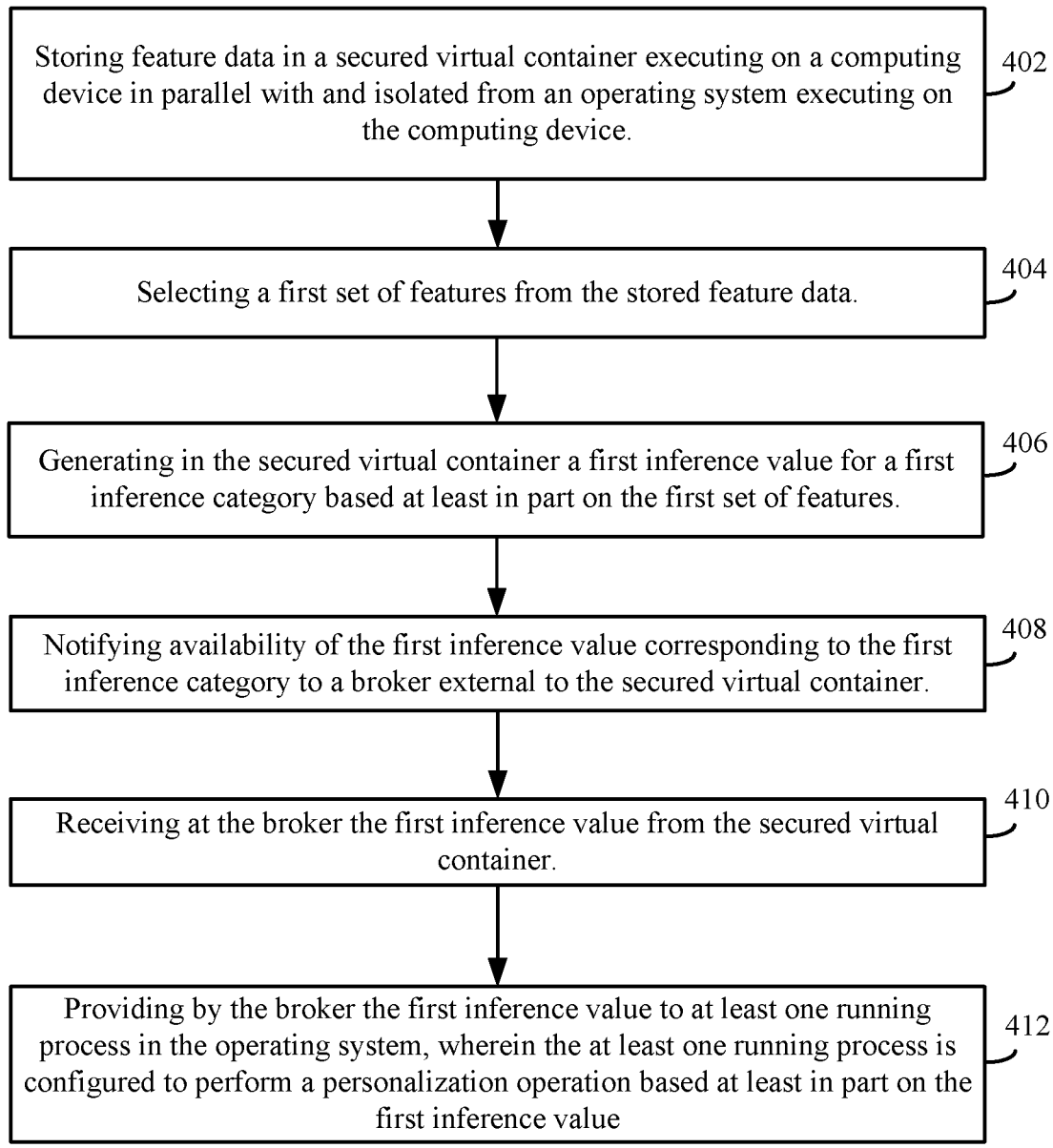
FIG. 4 depicts a flowchart of an example method for providing secure hyper-personalization in a computing device, according to an embodiment.
Figure 5:
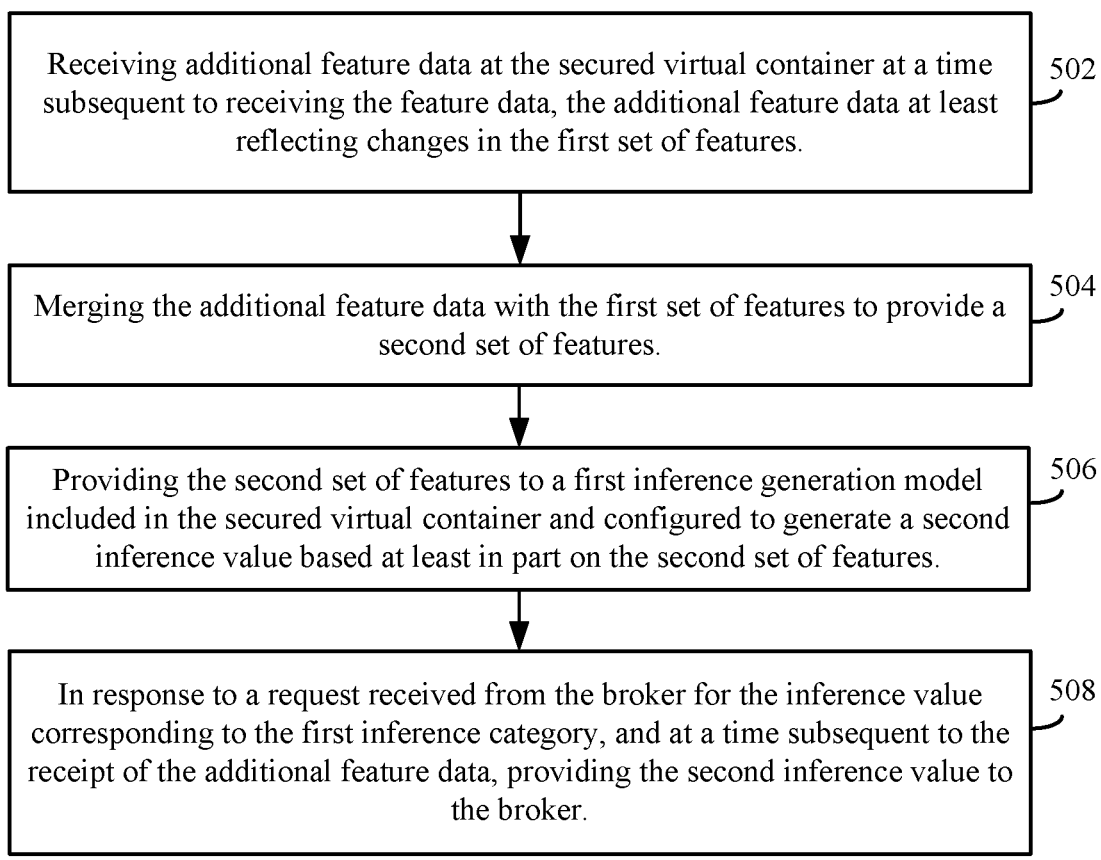
FIG. 5 depicts a flowchart of a refinement to the flowchart of FIG. 4 for providing updated inference values when providing secure hyper-personalization, according to an embodiment.

For example, FIG. 5 depicts a flowchart 500 of an additional example method of generating event suggestions, according to an embodiment, and wherein flowchart 500 comprises refinements or additions to the method steps of flowchart 400 as depicted in FIG. 4. Accordingly, flowchart 500 of FIG. 5 will also be described with continued reference to protected personalization system 110 of FIG. 2 and personalization broker 202, protected personalization container 204, personalization data processor 206 and ML engine 208 of FIGS. 2 and 3. However, other structural and operational embodiments will be apparent to persons skilled in the relevant art(s) based on the following discussion regarding flowchart 500.

In step 502, additional feature data is received at the secured virtual container at a time subsequent to receiving the feature data, the additional feature data at least reflecting changes in the first set of features. For example, and with continued reference to protected personalization system 110 of FIGS. 2 and 3, information corresponding to a user and/or the user's operating environment is, as described above, being constantly gathered over time. Accordingly, user data 220 is constantly being transmitted to personal data store 210 for storage. Such user data 220 comprises additional feature data inasmuch as such data is subject to normalization or other feature engineering operations as known in the art. Flowchart 500 continues at step 504.

In step 504, the additional feature data is merged with the first set of features to provide a second set of features. For example, and with continued reference to protected personalization system 110 of FIGS. 2 and 3, personal data store 210 may already contain user data 220 that was previously gathered by the system and received by personal data store 210 for storage. As discussed above, as new user data 220 is gathered and transmitted to personal data store 210 for storage, such user data 220 must be reconciled with or merged with existing data. For example, suppose an embodiment of computing device 102 of FIG. 1 is configured to send the lock state of computing device 102 to personal data store 210 for storage. In such an instance, the current lock state should always be persisted, but prior lock states and timestamps associated therewith may be useful for determining usage patterns of computing device 102. Accordingly, historic lock state information may be maintained, and subsequently augmented with new lock state information as it is received at personal data store 210. Further, when user data 220 has changed, embodiments of personal data store 210 and/or personalization data processor 206 may generate or receive updated features (i.e., "second set of features") based on feature engineering of such changed user data 220. Flowchart 500 continues at step 506.

In step 506, the second set of features is provided to a first inference generation model included in the secured virtual container and configured to generate a second inference value based at least in part on the second set of features. For example, as described above in conjunction with step 406 of flowchart 400 of FIG. 4, ML engine 208 may be configured to include a suitably trained machine learning model configured to accept feature data (i.e., feature engineered user data 220) retrieved from personal data store 210, and to generate one or more inference values in the manner described in detail above, in embodiments. ML engine 208 of personalization data processor 206 may likewise be configured to generate additional inference values as new or changed user data 220 is received and stored at personal data store 210. Flowchart 500 concludes at step 508.

In step 508, in response to a request received from the broker for the inference value corresponding to the first inference category, and at a time subsequent to the receipt of the additional feature data, the second inference value is provided to the broker. For example, and with continued reference to protected personalization system 110 of FIGS. 2 and 3, embodiments may operate as described above, wherein personalization data processor 206 may be configured to generate and send notifications to external applications and/or components regarding changes or availability of inference values corresponding to one or more inference categories. More specifically, and also as described above, entities external to protected personalization system 110 may subscribe via personalization broker 202 to receive notifications regarding one or more inference values or inference categories, and personalization data processor 206 may be configured to generate such notifications in response to changes to feature values/categories of interest. Alternatively, personalization data processor 206 may also be configured to directly push updated inference values to subscribing components, where the updated inference values themselves serve as a notification.

In the foregoing discussion of steps 502-508 of flowchart 500, it should be understood that at times, such steps may be performed in a different order or even contemporaneously with other steps. Other operational embodiments will be apparent to persons skilled in the relevant art(s). Note also that the foregoing general description of the operation of protected personalization system 110 is provided for illustration only, and embodiments of protected personalization system 110 may comprise different hardware and/or software, and may operate in manners different than described above.

Figure 6:
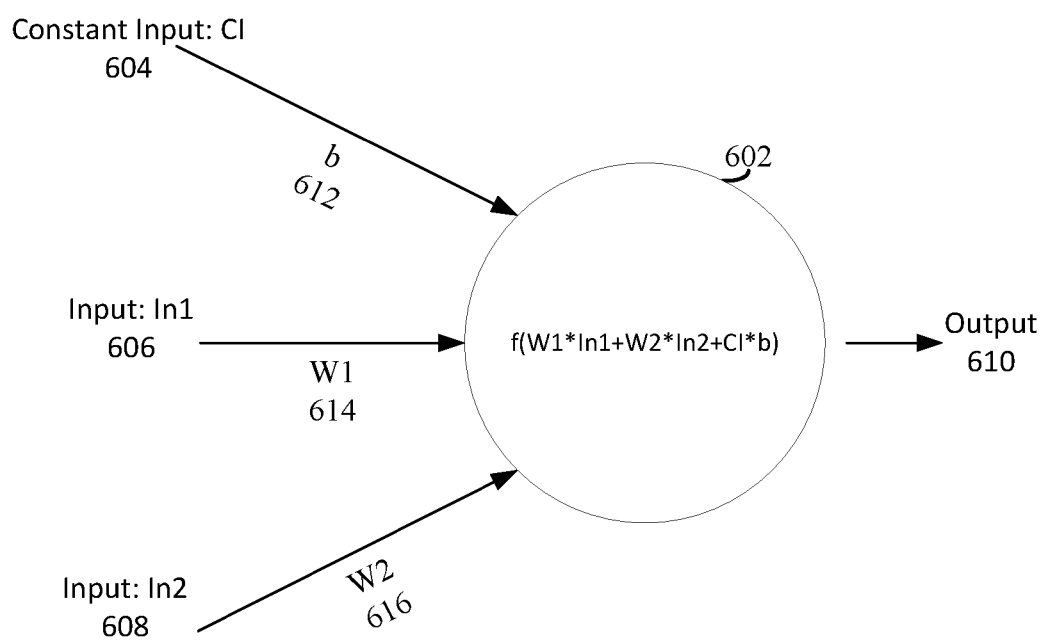
FIG. 6 depicts an example artificial neuron suitable for use in a deep neural network ("DNN"), according to an embodiment.

As discussed above, embodiments may include and/or use various machine learning platforms and algorithms. For example, ONNX models, or other types of machine learning models that may be available or generated, may be adapted to generate inferences 112 from user data 220. For example, a deep neural network ("DNN") may be constructed to generate one or more inferences 112 based on user data 220. A DNN is a type of artificial neural network that conceptually is comprised of artificial neurons. For example, FIG. 6 depicts an example artificial neuron 600 suitable for use in a DNN, according to an embodiment. Neuron 600 includes an activation function 602, a constant input CI 604, an input In1 606, an input In2 608 and output 610. Neuron 600 of FIG. 6 is merely exemplary, and other structural or operational embodiments will be apparent to persons skilled in the relevant art(s) based on the following discussion regarding neuron 600 of FIG. 6.

Neuron 600 operates by performing activation function 602 on weighted versions of inputs CI 604, In1 606 and In2 608 to produce output 610. Inputs to activation function 602 are weighted according to weights b 612, W1 614 and W2 616. Inputs In1 606 and In2 608 may comprise, for example, normalized or otherwise features processed data corresponding to user data 220. Activation function 602 is configured to accept a single number (i.e., in this example, the linear combination of weighted inputs) based on all inputs, and perform a fixed operation. As known in the art, such operations may comprise, for example, sigmoid, tan h or rectified linear unit operations. Input CI 604 comprises a constant value which may typically be set to the value 1, the purpose of which will be discussed further below.

Figure 7:
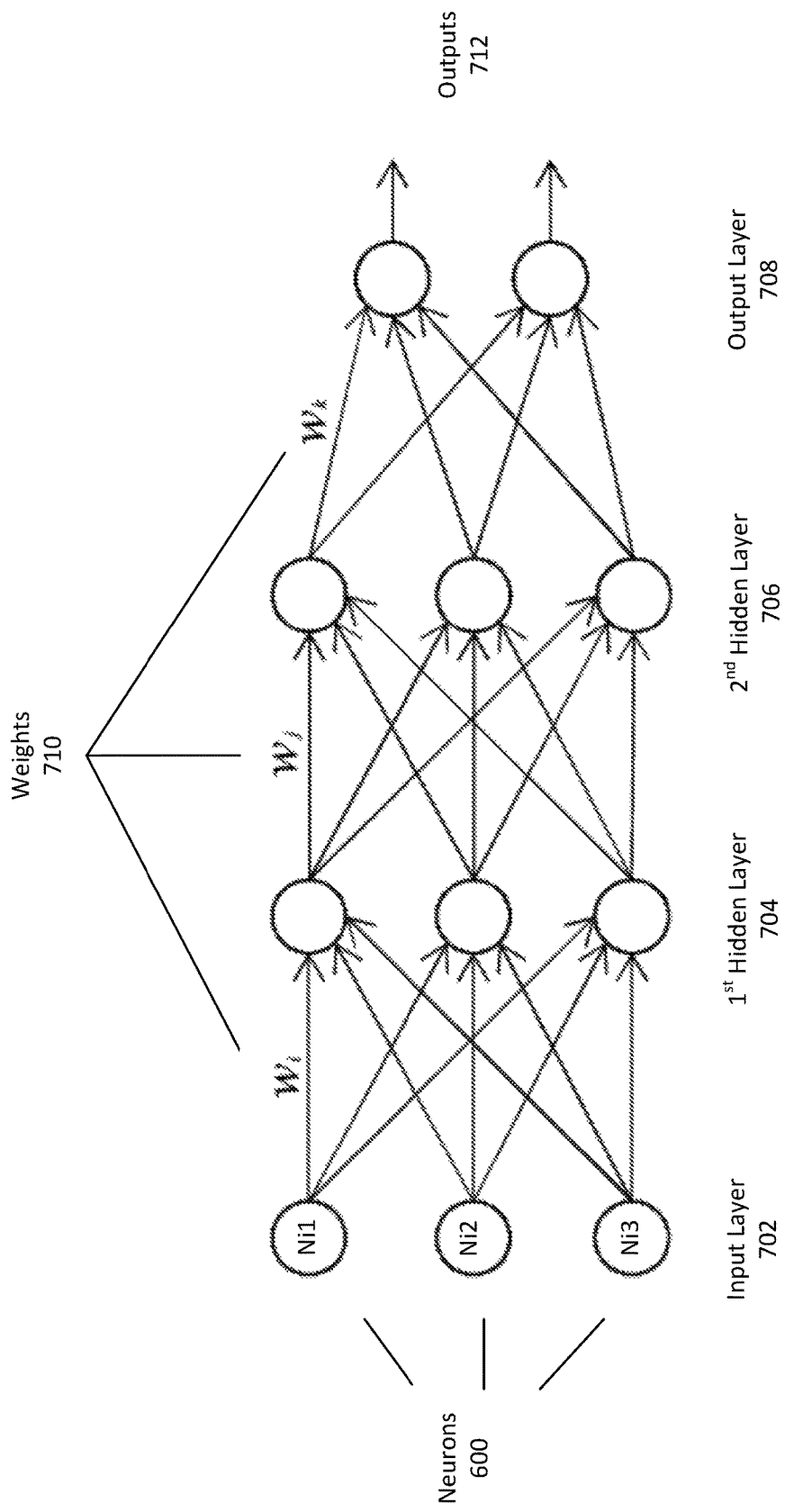
FIG. 7 depicts an example DNN composed of artificial neurons, according to an embodiment.

A single neuron generally accomplishes very little, and a useful machine learning model typically includes the combined computational effort of a large number of neurons working in concert. For example, FIG. 7 depicts an example deep neural network ("DNN") 700 composed of neurons 600, according to an embodiment. DNN 700 includes a plurality of neurons 600 assembled in layers and connected in a cascading fashion. Such layers include an input layer 700, a $1^{st}$ hidden layer 704, a $2^{nd}$ hidden layer 706 and an output layer 708. DNN 700 depicts outputs of each layer of neurons being weighted according to weights 710, and thereafter serving as inputs solely to neurons in the next layer. It should be understood, however, that other interconnection strategies are possible in other embodiments, and as is known in the art.

Neurons 600 of input layer 702 (labeled Ni1, Ni2 and Ni3) each may be configured to accept normalized or otherwise feature engineered or processed data corresponding to user data 220 as described above in relation to neuron 600 of FIG. 6. The output of each neuron 600 of input layer 702 is weighted according to the weight of weights 710 that corresponds to a particular output edge, and is thereafter applied as input at each neuron 600 of $1^{st}$ hidden layer 704.

It should be noted that each edge depicted in DNN 700 corresponds to an independent weight, and labeling of such weights for each edge is omitted for the sake of clarity. In the same fashion, the output of each neuron 600 of $1^{st}$ hidden layer 704 is weighted according to its corresponding edge weight, and provided as input to a neuron 600 in $2^{nd}$ hidden layer 706. Finally, the output of each neuron 600 of $2^{nd}$ hidden layer 706 is weighted and provided to the inputs of the neurons of output layer 708. The output or outputs of the neurons 600 of output layer 708 comprises the output of the model. In the context of the descriptions above, such outputs comprise inferences 112. Note, although output layer 708 includes two neurons 600, embodiments may instead of just a single output neuron 600, and therefore but a single discrete output. Note also, that DNN 700 of FIG. 7 depicts a simplified topology, and a producing useful inferences from a DNN like DNN 700 typically requires far more layers, and far more neurons per layer. Thus, DNN 700 should be regarded as a simplified example only.

Construction of the above described DNN 700 comprises the start of generating a useful machine learning model. The accuracy of the inferences generated by such a DNN require selection of a suitable activation function, and thereafter each and every one of the weights of the entire model are adjusted to provide accurate output. The process of adjusting such weights is called "training." Training a DNN, or other type of neural network, requires a collection of training data with known characteristics. For example, where a DNN is intended to predict the probability that an input image of a piece of fruit is an apple or a pear, the training data would comprise many different images of fruit, and typically include not only apples and pears, but also plums, oranges and other types of fruit. Training requires that the image data corresponding to each image is pre-processed according to normalization and/or feature extraction techniques as known in the art to produce input features for the DNN, and such features thereafter are input to the network. In the example above, such features are input to the neurons of input layer 702.

Thereafter, each neuron 600 of DNN 700 performs their respective activation function operation, the output of each neuron 600 is weighted and fed forward to the next layer, and so forth until outputs are generated by output layer 708. The output(s) of the DNN may thereafter be compared to the known or expected value of the output. The output of the DNN may then be compared to the expected value and the difference fed backward through the network to revise the weights contained therein according to a backward propagation algorithm as known in the art. With the model including revised weights, the same image features may again be input to the model (e.g., neurons 600 of input layer 702 of DNN 700 described above), and new output generated. Training comprises iterating the model over the body of training data and updating the weights at each iteration. Once the model output achieves sufficient accuracy (or outputs have otherwise converged and weight changes are having little effect), the model is said to be trained. A trained model may thereafter be used to evaluate arbitrary input data, the nature of which is not known in advance, nor has the model previously considered (e.g., a new picture of a piece of fruit), and output the desired inference (e.g., the probability that the image is that of an apple).

In embodiments, ML Engine 208 as described above may be configured to enable generating and training machine learning models such as, for example, deep neural networks as described herein above. For example, various platforms such as Keras or TensorFlow may permit the construction of an untrained DNN suitable for use with ML Engine 208, and such a model thereafter trained using user data 220. Alternatively, pre-trained machine learning model (e.g., a DNN with optimal or near optimal weights for a given problem) may be imported to ML Engine 208, and thereafter accept user data 220 as input for generation of inferences 112.

III. Example Mobile Device Implementation

Figure 8:
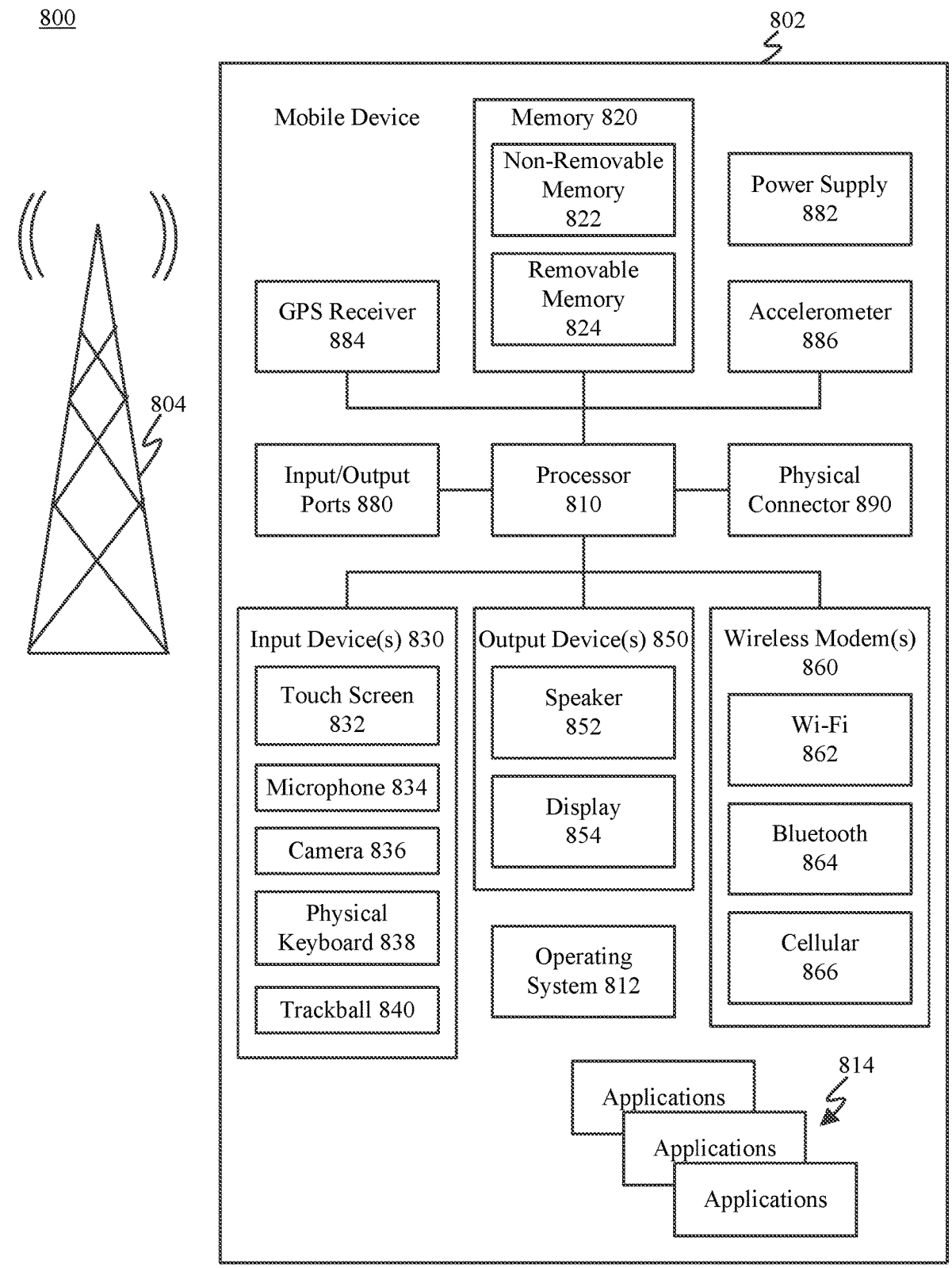
FIG. 8 is a block diagram of an example mobile device that may implement embodiments described herein.

FIG. 8 is a block diagram of an exemplary mobile device 802 that may implement embodiments described herein. For example, mobile device 802 may be used to implement protected personalization system 110, protected personalization container 204, personalization data processor 206, ML engine 208, personal data store 210 and/or personalization broker 202, and/or any of the components respectively described therein and/or any of the steps of any of flowcharts 400 and/or 500. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA), etc.) and can allow wireless two-way communications with one or more mobile communications networks 804, such as a cellular or satellite network, or with a local area or wide area network. Mobile device 802 can also be any of a variety of wearable computing device (e.g., a smart watch, an augmented reality headset, etc.).

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

Wireless modem(s) 860 can be coupled to antenna(s) (not shown) and can support two-way communications between processor 810 and external devices, as is well understood in the art. Modem(s) 860 are shown generically and can include a cellular modem 866 for communicating with the mobile communication network 804 and/or other radio-based modems (e.g., Bluetooth 864 and/or Wi-Fi 862). At least one of wireless modem(s) 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1594 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of protected personalization system 110, protected personalization container 204, personalization data processor 206, ML engine 208, personal data store 210 and/or personalization broker 202, and/or any of the components respectively described therein and/or any of the steps of any of flowcharts 400 and/or 500. Computer program logic for performing the functions of these devices may be stored in memory 820 and executed by processor 810.

IV. Example Computer System Implementation

Each of protected personalization system 110, protected personalization container 204, personalization data processor 206, ML engine 208, personal data store 210 and/or personalization broker 202, and flowcharts 400 and/or 500 may be implemented in hardware, or hardware combined with software and/or firmware. For example, protected personalization system 110, protected personalization container 204, personalization data processor 206, ML engine 208, personal data store 210 and/or personalization broker 202, and flowcharts 400 and/or 500 may be implemented as computer program code/instructions configured to be executed in one or more processors and stored in a computer readable storage medium. Alternatively, protected personalization system 110, protected personalization container 204, personalization data processor 206, ML engine 208, personal data store 210 and/or personalization broker 202, and flowcharts 400 and/or 500 may be implemented as hardware logic/electrical circuitry.

For instance, in an embodiment, one or more, in any combination, of protected personalization system 110, protected personalization container 204, personalization data processor 206, ML engine 208, personal data store 210 and/or personalization broker 202, and flowcharts 400 and/or 500 may be implemented together in a SoC. The SoC may include an integrated circuit chip that includes one or more of a processor (e.g., a central processing unit (CPU), microcontroller, microprocessor, digital signal processor (DSP), one or more graphics processing units (GPUs), etc.), memory, one or more communication interfaces, and/or further circuits, and may optionally execute received program code and/or include embedded firmware to perform functions.

Figure 9:
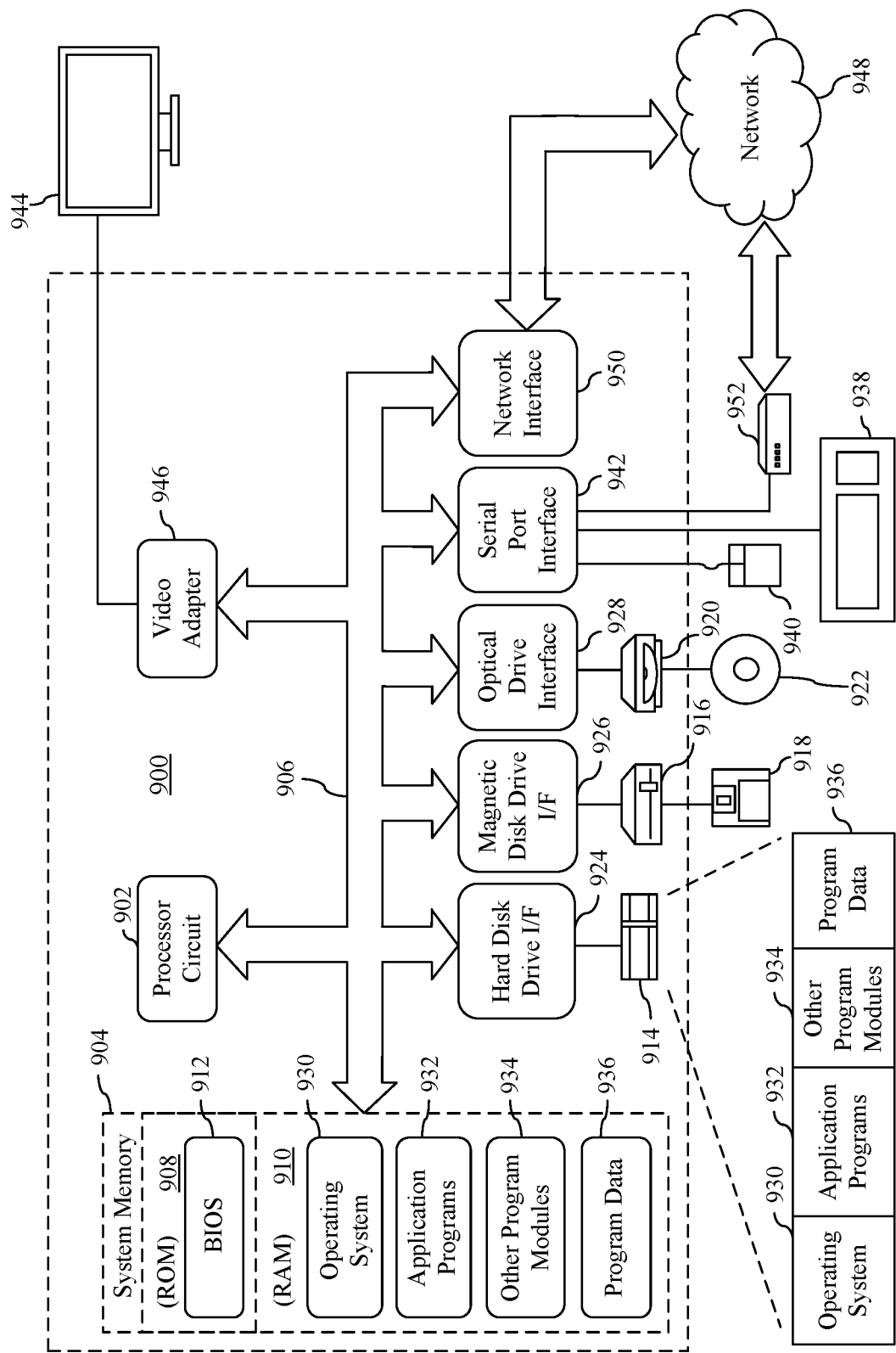
FIG. 9 is a block diagram of an example computer system in which embodiments may be implemented.

FIG. 9 depicts an exemplary implementation of a computing device 900 in which embodiments may be implemented. For example, user device 138 and server(s) 140 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing protected personalization system 110, protected personalization container 204, personalization data processor 206, ML engine 208, personal data store 210 and/or personalization broker 202, and flowcharts 400 and/or 500 (including any suitable step of flowcharts 400 and/or 500), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A method in a computing device for providing secure hyper-personalization is provided herein. The method comprising: in a secured virtual container executing on the computing device isolated from an operating system executing on the computing device: storing feature data; selecting a first set of features from the stored feature data; generating a first inference value for a first inference category based at least in part on the first set of features; and notifying availability of the first inference value corresponding to the first inference category to a broker external to the secured virtual container; and in the broker in the computing device: receiving the first inference value from the secured virtual container; and providing the first inference value to at least one running process in the operating system, wherein the at least one running process is configured to perform a personalization operation based at least in part on the first inference value.

In an embodiment of the foregoing method, the first inference value is generated by a first inference generation model included in the secured virtual container.

In another embodiment of the foregoing method, feature data and the first inference generation model are maintained securely to each be inaccessible outside the secured virtual container.

In one embodiment of the foregoing method, feature data includes at least one of transient data, personal data specific to at least one user of the computing device, and policies to be enforced by the computing device.

In an embodiment of the foregoing method, transient data comprises short-term operating data collected by the computing device within a pre-determined recent time interval, operating data comprising at least one of: the lock state of the computing device, the identity of the at least one user of the computing device, the location of the computing device, policy violations on the computing device, the identity of persons physically present with the at least one user of the computing device, the task being performed on the computing device, reminders, SMS or MMS messages, emails, memory and/or file access signals, application states and application specific data.

In another embodiment of the foregoing method, personal data specific to at least one user comprises at least one of the following types of data corresponding to the at least one user: risk profile, financial profile, habits, hobbies, relationships, demographic data and application personalization data.

In one embodiment of the foregoing method, the first inference generation model comprises a suitably trained machine learning model configured to output the first inference value.

In an embodiment of the foregoing method, the secured virtual container and the operating system are each executing through a shared hypervisor.

In another embodiment of the foregoing method, the method further comprises: receiving additional feature data at the secured virtual container at a time subsequent to receiving the feature data, the additional feature data at least reflecting changes in the first set of features; merging the additional feature data with the first set of features to provide a second set of features; providing the second set of features to the first inference generation model, the first inference generation model further configured to generate a second inference value based at least in part on the second set of features; and in response to a request received from the broker for the inference value corresponding to the first inference category, and at a time subsequent to the receipt of the additional feature data, providing the second inference value to the broker.

A system for providing secure hyper-personalization is provided herein. In an embodiment, the system comprises: one or more processor circuits; one or more memory devices connected to the one or more processor circuits, the one or more memory devices storing computer program logic for execution by the one or more processor circuits. In an embodiment, the computer program logic comprises: an operating system; a secured virtual container isolated from the operating system; a personalization broker executing in the operating system; a personalization data processor executing in the secured virtual container and configured to: store feature data; select a first set of features from the stored feature data; generate a first inference value for a first inference category based at least in part on the first set of features; and notify availability of the first inference value corresponding to the first inference category to the personalization broker; and the personalization broker configured to: receive the first inference value from the personalization data processor; and provide the first inference value to at least one running process in the operating system, wherein the at least one running process is configured to perform a personalization operation based at least in part on the first inference value.

In another embodiment of the foregoing system, the first inference value is configured to be generated by a first inference generation model included in the personalization data processor.

In an additional embodiment of the foregoing system, the first inference generation model comprises a suitably trained machine learning model configured to output the first inference value.

In one embodiment of the foregoing system, the secured virtual container is further configured to maintain the feature data and the first inference generation model are securely such that each is inaccessible outside the secured virtual container.

In another embodiment of the foregoing system, feature data comprises at least one of transient data, personal data specific to at least one user of the computing device, and policies to be enforced by the computing device.

In an additional embodiment of the foregoing system, transient data comprises short-term operating data collected by the computing device within a pre-determined recent time interval, operating data comprising at least one of: the lock state of the computing device, the identity of the at least one user of the computing device, the location of the computing device, policy violations on the computing device, the identity of persons physically present with the at least one user of the computing device, the task being performed on the computing device, reminders, SMS or MMS messages, emails, memory and/or file access signals, application states and application specific data.

In one embodiment of the foregoing system, personal data specific to at least one user comprises at least one of the following types of data corresponding to the at least one user: risk profile, financial profile, habits, hobbies, relationships, demographic data and application personalization data.

In another embodiment of the foregoing system, the secured virtual container and the operating system are each configured to execute through a shared hypervisor.

In an additional embodiment of the foregoing system, wherein the personalization data processor is further configured to: receive additional feature data at a time subsequent to receiving the feature data, the additional feature data at least reflecting changes in the first set of features; merge the additional feature data with the first set of features to provide a second set of features; provide the second set of features to the first inference generation model, the first inference generation model further configured to generate a second inference value based at least in part on the second set of features; and in response to a request received from the personalization broker for the inference value corresponding to the first inference category, and at a time subsequent to the receipt of the additional feature data, provide the second inference value to the personalization broker.

A computer program product is provided here, the computer program product comprising a computer-readable memory device having computer program logic recorded thereon that when executed by at least one processor of a computing device causes the at least one processor to perform operations for providing secure hyper-personalization to a user, the operations comprising: executing a personalization broker in an operating system running on the computing device; executing a secured virtual container on the computing device, the secured virtual container isolated from the operating system, the secured virtual container configured to: store feature data; select a first set of features from the stored feature data; generate a first inference value for a first inference category based at least in part on the first set of features; and notify availability of the first inference value corresponding to the first inference category to the personalization broker; and the personalization broker configured to: receive the first inference value from the secured virtual container; and provide the first inference value to at least one running process in the operating system, wherein the at least one running process is configured to perform a personalization operation based at least in part on the first inference value.

In another embodiment of the aforementioned computer program product, wherein the secured virtual container is further configured to: receive additional feature data at a time subsequent to receiving the feature data, the additional feature data at least reflecting changes in the first set of features; merge the additional feature data with the first set of features to provide a second set of features; generate a second inference value for the first inference category based at least in part on the second set of features; and in response to a request received from the personalization broker for the inference value corresponding to the first inference category, and at a time subsequent to receiving the additional feature data, provide the second inference value to the personalization broker.

VI. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method in a computing device for providing secure hyper-personalization, comprising:
in a secured virtual container executing on the computing device and isolated from an operating system executing on the computing device:
storing feature data comprising policy data for usage of the computing device and state data representing a current usage of the computing device;
selecting a first set of features from the stored feature data;
generating a first inference value for a first inference category based at least in part on the first set of features, the first inference value representing a probability that a proposition about a user of the computing device is true; and
notifying availability of the first inference value corresponding to the first inference category to a broker external to the secured virtual container; and
in the broker in the computing device:
receiving the first inference value from the secured virtual container; and
providing the first inference value to at least one running process in the operating system, wherein the at least one running process is configured to perform a personalization operation based at least in part on the first inference value.

2. The method of claim 1, wherein the first inference value is generated by a first inference generation model included in the secured virtual container.

3. The method of claim 2, wherein the feature data and the first inference generation model are maintained securely to each be inaccessible outside the secured virtual container.

4. The method of claim 1, wherein the feature data further comprises at least one of transient data or personal data specific to at least one user of the computing device.

5. The method of claim 4, wherein the transient data comprises short-term operating data collected by the computing device within a pre-determined recent time interval, the short-term operating data comprising at least one of: a lock state of the computing device, an identity of the at least one user of the computing device, a location of the computing device, policy violations on the computing device, an identity of persons physically present with the at least one user of the computing device, a task being performed on the computing device, reminders, SMS or MMS messages, emails, memory and/or file access signals, application states and application specific data.

6. The method of claim 4, wherein personal data specific to at least one user comprises at least one of: risk profile, financial profile, habits, hobbies, relationships, demographic data and application personalization data.

7. The method of claim 2, wherein the first inference generation model comprises a suitably trained machine learning model configured to output the first inference value.

8. The method of claim 1, wherein the secured virtual container and the operating system are each executing through a shared hypervisor.

9. The method of claim 2 further comprising:
receiving additional feature data at the secured virtual container at a time subsequent to receiving the feature data, the additional feature data at least reflecting changes in the first set of features;
merging the additional feature data with the first set of features to provide a second set of features;
providing the second set of features to the first inference generation model, the first inference generation model further configured to generate a second inference value based at least in part on the second set of features; and
in response to a request received from the broker for the second inference value corresponding to the first inference category, and at a time subsequent to receipt of the additional feature data, providing the second inference value to the broker.

10. A system, comprising:
one or more processor circuits;
one or more memory devices connected to the one or more processor circuits, the one or more memory devices storing computer program logic for execution by the one or more processor circuits, the computer program logic comprising:
an operating system;
a secured virtual container isolated from the operating system;
a personalization data processor executing in the secured virtual container and configured to:
store feature data comprising policy data for usage of a computing device and state data representing a current usage of the computing device;
select a first set of features from the stored feature data;
generate a first inference value for a first inference category based at least in part on the first set of features, the first inference value representing a probability that a proposition about a user of the computing device is true; and
notify availability of the first inference value corresponding to the first inference category; and
a personalization broker executing in the operating system and configured to:
receive the first inference value from the personalization data processor; and
provide the first inference value to at least one running process in the operating system, wherein the at least one running process is configured to perform a personalization operation based at least in part on the first inference value.

11. The system of claim 10, wherein the first inference value is configured to be generated by a first inference generation model included in the personalization data processor.

12. The system of claim 11 wherein the first inference generation model comprises a suitably trained machine learning model configured to output the first inference value.

13. The system of claim 11, wherein the secured virtual container is further configured to maintain the feature data and the first inference generation model are securely such that each is inaccessible outside the secured virtual container.

14. The system of claim 10, wherein the feature data further comprises at least one of transient data or personal data specific to at least one user of the computing device.

15. The system of claim 14, wherein the transient data comprises short-term operating data collected by the computing device within a pre-determined recent time interval, the short-term operating data comprising at least one of: a lock state of the computing device, an identity of the at least one user of the computing device, a location of the computing device, policy violations on the computing device, an identity of persons physically present with the at least one user of the computing device, a task being performed on the computing device, reminders, SMS or MMS messages, emails, memory and/or file access signals, application states and application specific data.

16. The system of claim 14, wherein personal data specific to at least one user comprises at least one of: risk profile, financial profile, habits, hobbies, relationships, demographic data and application personalization data.

17. The system of claim 10, wherein the secured virtual container and the operating system are each configured to execute through a shared hypervisor.

18. The system of claim 11, wherein the personalization data processor is further configured to:
receive additional feature data at a time subsequent to receiving the feature data, the additional feature data at least reflecting changes in the first set of features;
merge the additional feature data with the first set of features to provide a second set of features;
provide the second set of features to the first inference generation model, the first inference generation model further configured to generate a second inference value based at least in part on the second set of features; and
in response to a request received from the personalization broker for the second inference value corresponding to the first inference category, and at a time subsequent to receipt of the additional feature data, provide the second inference value to the personalization broker.

19. A computer program product comprising a computer-readable memory device having computer program logic recorded thereon that when executed by at least one processor of a computing device causes the at least one processor to perform operations, the operations comprising:
executing a secured virtual container on the computing device, the secured virtual container isolated from an operating system running on the computing device, the secured virtual container configured to:
store feature data comprising policy data for usage of the computing device and state data representing a current usage of the computing device;
select a first set of features from the stored feature data;
generate a first inference value for a first inference category based at least in part on the first set of features, the first inference value representing a probability that a proposition about a user of the computing device is true; and
notify availability of the first inference value corresponding to the first inference category; and
executing a personalization broker in the operating system, the personalization broker configured to:
receive the first inference value from the secured virtual container; and
provide the first inference value to at least one running process in the operating system, wherein the at least one running process is configured to perform a personalization operation based at least in part on the first inference value.

20. The computer program product of claim 19, wherein the secured virtual container is further configured to:
receive additional feature data at a time subsequent to receiving the feature data, the additional feature data at least reflecting changes in the first set of features;
merge the additional feature data with the first set of features to provide a second set of features;
generate a second inference value for the first inference category based at least in part on the second set of features; and
in response to a request received from the personalization broker for the second inference value corresponding to the first inference category, and at a time subsequent to receiving the additional feature data, provide the second inference value to the personalization broker.

\* \* \* \* \*